(12) United States Patent
Huang

(10) Patent No.: US 9,103,525 B2
(45) Date of Patent: Aug. 11, 2015

(54) LED MODULE AND METHOD FOR MANUFACTURING THE SAME

(71) Applicant: HON HAI PRECISION INDUSTRY CO., LTD., New Taipei (TW)

(72) Inventor: Yung-Lun Huang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 139 days.

(21) Appl. No.: 13/870,146

(22) Filed: Apr. 25, 2013

(65) Prior Publication Data

US 2014/0177232 A1     Jun. 26, 2014

(30) Foreign Application Priority Data

Dec. 26, 2012  (TW) .............................. 101150290 A

(51) Int. Cl.
*F21V 5/04* (2006.01)
*G02B 5/02* (2006.01)
*F21V 5/08* (2006.01)
*G02B 19/00* (2006.01)
*F21Y 101/02* (2006.01)

(52) U.S. Cl.
CPC ... *F21V 5/04* (2013.01); *F21V 5/08* (2013.01); *G02B 5/0242* (2013.01); *G02B 19/0014* (2013.01); *G02B 19/0061* (2013.01); *F21Y 2101/02* (2013.01); *Y10T 29/49117* (2015.01)

(58) Field of Classification Search
CPC .. G02B 5/0236; G02B 5/0242; G02B 5/0247; G02B 19/0014; G02B 19/0061; F21V 5/04; F21V 5/08; F21K 99/00; F21Y 2101/02
USPC ............. 362/311.02, 311.04, 311.06, 311.09, 362/311.1, 326; 359/599
See application file for complete search history.

(56) References Cited

U.S. PATENT DOCUMENTS

| | | | |
|---|---|---|---|
| 6,657,382 B2 * | 12/2003 | Nagai et al. | 313/512 |
| 8,382,337 B2 * | 2/2013 | Ing et al. | 362/311.03 |
| 2011/0157896 A1 * | 6/2011 | Yu | 362/293 |
| 2012/0026720 A1 * | 2/2012 | Cho | 362/84 |

* cited by examiner

*Primary Examiner* — Alan Cariaso
(74) *Attorney, Agent, or Firm* — Novak Druce Connolly Bove + Quigg LLP

(57) ABSTRACT

An LED module includes an LED unit having an LED chip, a lens covering the LED chip, and a diffusing film. The lens includes a light-incident face facing the LED chip, a light-emitting face opposite to the light-incident face, and a connecting face connecting the light-incident face to the light-emitting face. The diffusing film has a plurality of macromolecule diffusing particles mixed therein, and is coated on the light-emitting face of the lens.

18 Claims, 1 Drawing Sheet

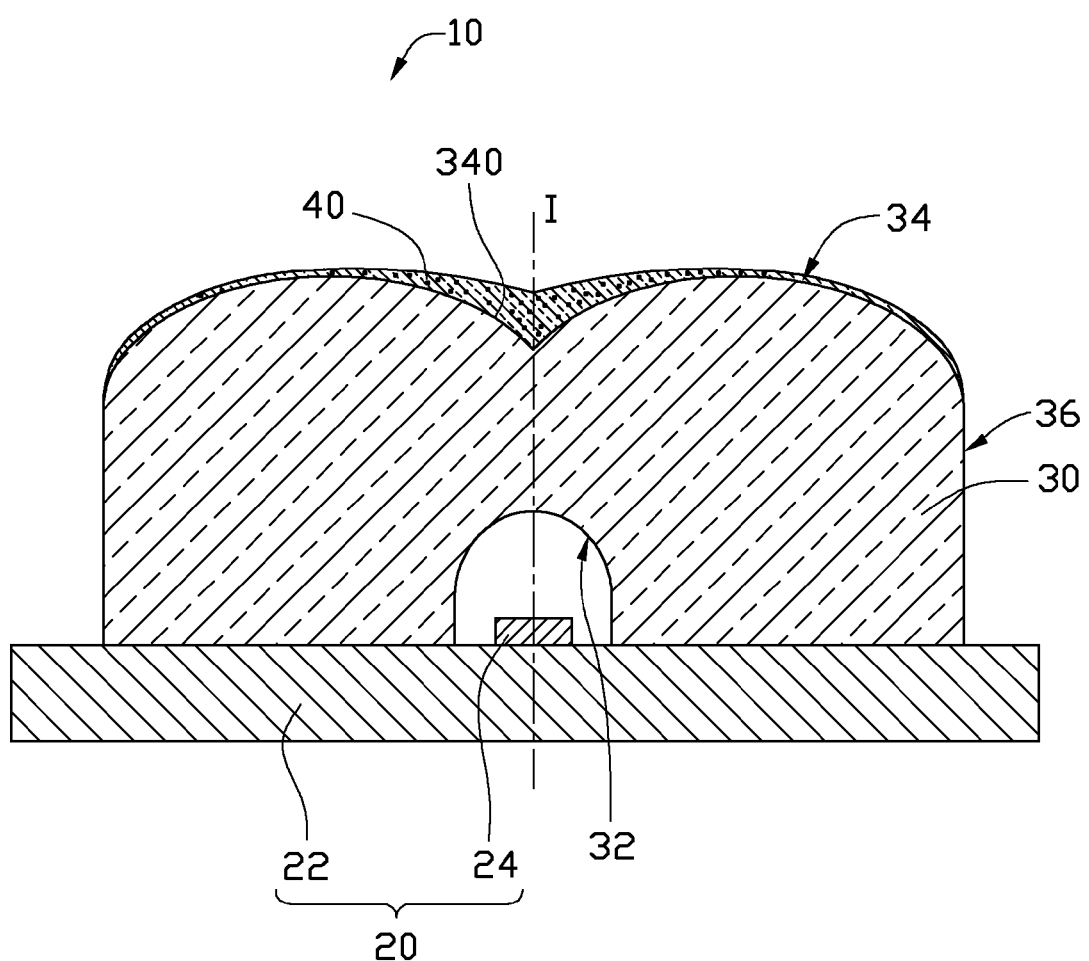

LED MODULE AND METHOD FOR MANUFACTURING THE SAME

BACKGROUND

1. Technical Field

The present disclosure generally relates to light sources, and particularly to a light emitting diode (LED) module and a method for manufacturing the same.

2. Description of the Related Art

Generally, a light source such as alight emitting diode (LED) can be adapted to an LED module for illuminating a flat display device, such as a liquid crystal display (LCD). Since the light-emitting angle of the LED is not larger than 120 degrees, the far-field pattern of the LED is quite narrow; there is nearly no light outside of 120 degrees from the LED. In other words, the light-emitting area of the LED is highly concentrated.

What is needed, therefore, is an improved LED module which overcomes the above described shortcomings.

BRIEF DESCRIPTION OF THE DRAWINGS

The drawing is an assembled, isometric view of an LED module in accordance with an exemplary embodiment of the disclosure.

DETAILED DESCRIPTION

Referring to the drawing, an LED module 10 in accordance with an exemplary embodiment of the disclosure is shown. The LED module 10 includes an LED unit 20, a lens 30 positioned on the LED unit 20 and covering the LED unit 20, and a diffusing film 40 coated on the lens 30.

The LED unit 20 includes a supporting base 22, and an LED chip 24 disposed on the supporting base 22. The supporting base 22 is flat. The supporting base 22 may be made of electrically-insulating materials such as silicon or ceramic. The LED chip 24 may be made of semiconductor materials such as GaN, InGaN, AlInGaN or the like. Preferably, the LED chip 24 emits visible light when being activated.

The lens 30 is made of transparent materials such as PC (polycarbonate) or PMMA (polymethyl methacrylate). The lens 30 includes a light-incident face 32 facing the LED chip 24, a light-emitting face 34 opposite to the light-incident face 32, and a connecting face 36 connecting the light-incident face 32 to the light-emitting face 34. The light-incident face 32 has a shape like a profile of a dome-like configuration. The light-incident face 32 is rotationally symmetrical relative to an optical axis I of the LED chip 24. The light-emitting face 34 is curved face. The light-emitting face 34 is rotationally symmetrical relative to the optical axis I of the LED chip 24. A center of the light-emitting face 34 is concaved downwardly to form a recessed portion 340 along a top-to-bottom direction. The recessed portion 340 is rotationally symmetrical relative to the optical axis I of the LED chip 24. A cross-section of the light-emitting face 34 includes a pair of first curved faces(not labeled) cooperatively forming a wing-shaped configuration, whereby light emitted from the LED chip 24 can have a bat wing-shaped pattern of distribution after leaving the lens 30. The two first curved faces are symmetrical. Each of the first curved faces is convex. Outer edge of each first curved face connects to the connecting face 36. Inner edges of the two first curved faces intersect at a joint (not labeled). The joint is located at the optical axis I of the LED chip 24. Most of the light emitted from the LED chip 24 leaves the lens 30 from the light-emitting face 34.

The diffusing film 40 is coated on the light-emitting face 34 of the lens 30. In this embodiment, the diffusing film 40 totally covers the light-emitting face 34. Alternatively, the diffusing film 40 could only partially cover the light-emitting face 34. The diffusing film 40 is made of polyester compound, such as polyethylene terephthalate, polybutylene terephthalate, or polyarylate and a mixture thereof. The diffusing film 40 is mixed with a plurality of macromolecule diffusing particles. A proportion of the macromolecule diffusing particles in the diffusing film 40 is preferably 5%~10%. A thickness of the diffusing film 40 gradually decreases from a center to a periphery of the light-emitting face 34. The thickness of the diffusing film 40 at the periphery thereof is about 5%~10% smaller than that of the diffusing film 40 at the center thereof. Preferably, an average of the thickness of the diffusing film 40 is about 38 um. It could be understood, a plurality of fluorescence, such as YAG, TAG, silicate, nitride, nitrogen oxides, phosphide, arsenide, telluride or sulfide, could be further provided to mix in the lens 30 or the diffusing film 40.

In use, the light emitted from the LED chip 24 of the LED unit 20 is passed through the lens 30, and then is diffused by the diffusing film 40, such that an illumination angle of the LED module 10 is widened whereby the LED module 10 can more evenly illuminate.

A method for manufacturing the LED module 10 is also provided. The method includes the following steps:

Firstly, a lens 30 is provided. The lens 30 includes a light-incident face 32, a light-emitting face 34 opposite to the light-incident face 32, and a connecting face 36 connecting the light-incident face 32 to the light-emitting face 34.

Secondly, polyester compound in a liquid state is provided. The liquid polyester compound is coated on the light-emitting face 34 of the lens 30 in a manner of spin coating, and then the polyester compound is solidified to form a diffusing film 40. The liquid polyester compound is mixed with a plurality of macromolecule diffusing particles.

Finally, an LED unit 20 is provided. The LED unit 20 includes a supporting base 22, and an LED chip 24 disposed on the supporting base 22. The lens 30 is fixed on the supporting base 22 and covers the LED chip 24. The light-incident face 32 of the lens 30 faces the LED chip 24.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A light emitting diode (LED) module comprising:
    an LED unit comprising an LED chip;
    a lens covering the LED chip, the lens comprising a light-incident face facing the LED chip, a light-emitting face opposite to the light-incident face, and a connecting face connecting the light-incident face to the light-emitting face; and
    a diffusing film coated on the light-emitting face of the lens, the diffusing film comprising a plurality of macromolecule diffusing particles mixed therein, wherein a thickness of the diffusing film gradually decreases from a center to a periphery of the light-emitting face, and wherein an entirety of the diffusing film is manufactured from a same material.

2. The LED module as claimed in claim 1, wherein a proportion of the macromolecule diffusing particles in the diffusing film is 5%~10%.

3. The LED module as claimed in claim 1, wherein the diffusing film is made of polyethylene terephthalate, polybutylene terephthalate, or polyarylate and a mixture thereof.

4. The LED module as claimed in claim 1, wherein the light-emitting face is curved, and the light-emitting face is rotationally symmetrical relative to an optical axis of the LED chip.

5. The LED module as claimed in claim 4, wherein a cross-section of the light-emitting face defines a pair of first curved faces cooperatively forming a wing-shaped configuration.

6. The LED module as claimed in claim 5, each of the pair of first curved faces is convex and smooth, and inner edges of the pair of first curved faces intersect at the optical axis of the LED chip.

7. The LED module as claimed in claim 4, wherein a center of the light-emitting face is concaved downwardly to form a recessed portion along a top-to-bottom direction.

8. The LED module as claimed in claim 7, wherein the recessed portion is rotationally symmetrical relative to an optical axis of the LED chip.

9. The LED module as claimed in claim 1, wherein the diffusing film completely covers the light-emitting face.

10. The LED module as claimed in claim 1, wherein the diffusing film is partially covers the light-emitting face.

11. The LED module as claimed in claim 1, wherein the thickness of the diffusing film at the periphery of the light-emitting face is 5%~10% smaller than the thickness of the diffusing film at the center of the light-emitting face .

12. The LED module as claimed in claim 1, wherein an average of a thickness of the diffusing film is 38 um.

13. A method for manufacturing an LED module, comprising steps of:
  making a lens, the lens comprising a light-incident face facing the LED chip, a light-emitting face opposite to the light-incident face, and a connecting face connecting the light-incident face to the light-emitting face;
  mixing a liquid polyester compound comprising a plurality of macromolecule diffusing particles;
  coating the liquid polyester compound on the light-emitting face of the lens by spin coating, and then solidifying the polyester compound to form a diffusing film, wherein a thickness of the diffusing film gradually decreases from a center to a periphery of the light-emitting face, and wherein an entirety of the diffusing film is manufactured from a same liquid polyester compound; and
  making an LED unit by disposing the LED chip on a supporting base, fixing the lens on the supporting base with the light-incident face facing the LED chip.

14. The method as claimed in claim 13, wherein a proportion of the macromolecule diffusing particles in the liquid polyester compound is 5%~10%.

15. The method as claimed in claim 13, wherein the liquid polyester compound is made of polyethylene terephthalate, polybutylene terephthalate, or polyarylate and a mixture thereof.

16. The method as claimed in claim 13, wherein the light-emitting face is curved, and the light-emitting face is rotationally symmetrical relative to an optical axis of the LED chip.

17. The method as claimed in claim 16, wherein a cross-section of the light-emitting face defines a pair of first curved faces cooperatively forming a wing-shaped configuration.

18. The method as claimed in claim 16, wherein a center of the light-emitting face is concaved downwardly to form a recessed portion along a top-to-bottom direction.

\* \* \* \* \*